March 19, 1957 F. H. RICE 2,785,797

PHONOGRAPH RECORD CONTAINER

Filed Dec. 8, 1954 2 Sheets-Sheet 1

INVENTOR

FREDERICK H. RICE

BY Herbert J. Jacobi

ATTORNEY

PHONOGRAPH RECORD CONTAINER

Filed Dec. 8, 1954 2 Sheets-Sheet 2

INVENTOR

FREDERICK H. RICE

BY Herbert J. Jacobi

ATTORNEY 2,785,797

PHONOGRAPH RECORD CONTAINER

Frederick H. Rice, Van Nuys, Calif.

Application December 8, 1954, Serial No. 473,935
4 Claims. (Cl. 206—62)

Figure 1:
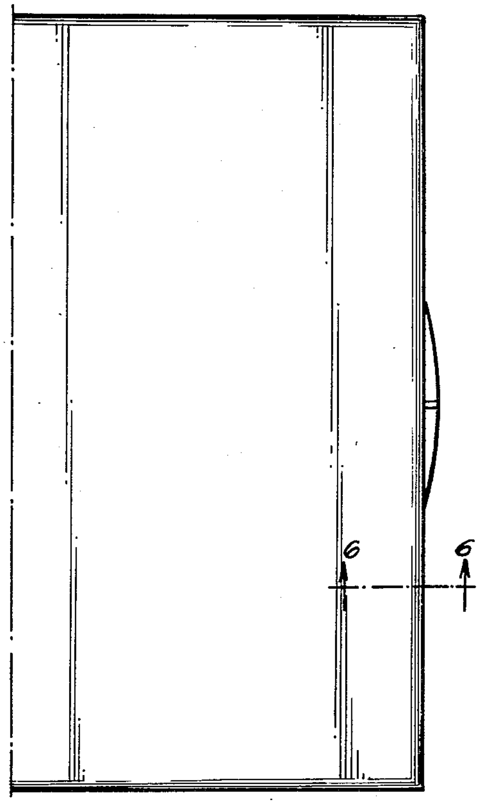

This invention relates to storage, display and merchandising and more particularly to a container for receiving and protecting a phonograph record, which container is attractive in appearance thereby promoting sales and at the same time, permits visual inspection of the record contained therein without contact of such record with the hands of the prospective purchaser.

During the past few years there have been rapid advancements in recording techniques and development of materials utilized in phonograph records with the result that at the present time, phonograph records are available which may be classified as high fidelity records and which, when utilized with suitable reproduction equipment, result in a substantially faithful reproduction of the original program material. As is well known, such records particularly those of the classics, are relatively costly, and likewise, are subject to damage by contact with objects and, in fact, mere contact of the hands with the grooved portion of a record is extremely undesirable, since the oil or greasy film deposited thereon by the fingers results in a collection of dust or other foreign material, which introduces spurious noises during playing of the record.

Heretofore, phonograph records have normally been displayed, stored and sold in albums or folders which are usually provided with relatively stiff covers to provide protection and these albums have commonly contained one or more envelopes for receiving the records comprising such albums. This arrangement, obviously, provides no real protection against the accumulation of dust on the surface of the record and even though the same has not been touched by the hands or fingers, thereby depositing an oily film thereon, in many instances, a charge of static electricity present on the surface of the record, results in the collection of an accumulation of dust thereon. Furthermore, the majority of record purchasers wish to visually inspect the record for imperfections or damage thereto prior to purchasing of the same, and consequently, with the present album method, it has been necessary to remove the records from the album and handle the same during the inspection process. This frequently results in damage to the record and almost invariably results in the deposition of an oily film thereon which, as stated above, promotes the accumulation and adherence of dust to the surface of the record.

Obviously, therefore, any container for storing and displaying a record which will protect the same against physical damage and at the same time permit visual inspection thereof without contact by the fingers or hands of the prospective purchaser would represent a very real step forward in the art, but in view of the relatively high cost of such records, it would be obviously extremely desirable to provide such a container which would be extremely economical to manufacture and which would not materially increase the selling price of the record or records to be contained therein. Due to the rapid advance in the development of transparent plastic materials and also to the advance in injection molding techniques, it is now possible to produce an injection molded transparent plastic container of a size and configuration to receive and retain a phonograph record, which container may be manufactured in mass production at a relatively low cost and consequently, may be utilized to contain individual phonograph records without materially adding to the selling price thereof.

It is accordingly an object of the invention to provide a phonograph record container of transparent material which will completely enclose a phonograph record and protect the same against damage or the collection of dust on the surface thereof.

A further object of the invention is the provision of a phonograph record container of transparent material including means for fixing the record therein against movement, and at the same time, permitting convenient removal of such record from the container.

A still further object of the invention is the provision of a phonograph record container including means for preventing movement of the record therein and for supporting such record with the grooved portions thereof out of contact with any part of the container.

A still further object of the invention is the provision of a phonograph record container of transparent material having means for removably supporting therein a decorative panel, booklet or label which is visible through the container and which may be conveniently removed for study of the contents thereof.

Another object of the invention is the provision of a phonograph record container of transparent material, which container comprises a record holding section and a cover section, each section being of one-piece molded construction.

A further object of the invention is the provision of a phonograph record container comprising a record holding section and a cover section and in which a dust proof joint is provided between such sections.

A still further object of the invention is the provision of a phonograph record container of transparent material which may be utilized for storing the record in the home as well as in the store, and in which the record may be conveniently removed therefrom and replaced therein after playing.

Another object of the invention is the provision of a phonograph record container of transparent material which may be conveniently and economically constructed by injection molding processes thereby providing a container which will not materially add to the cost of a record contained therein.

Figure 2:
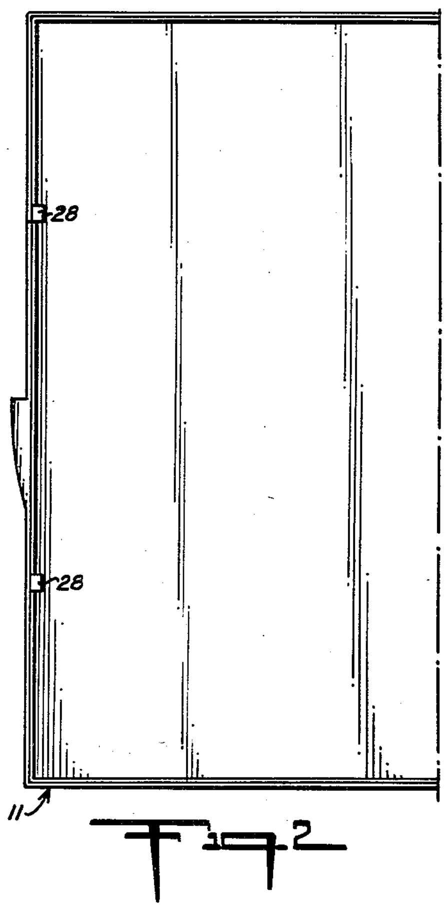
Figure 9:
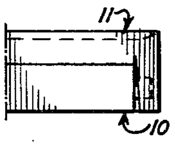
Figure 10:
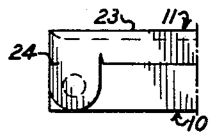
Figure 6:
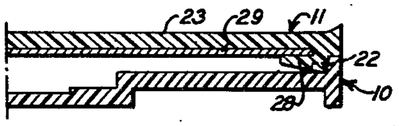
Figure 8:
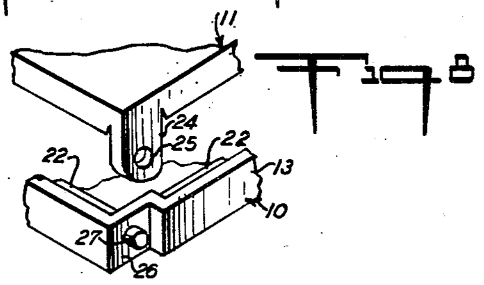
Figure 3:
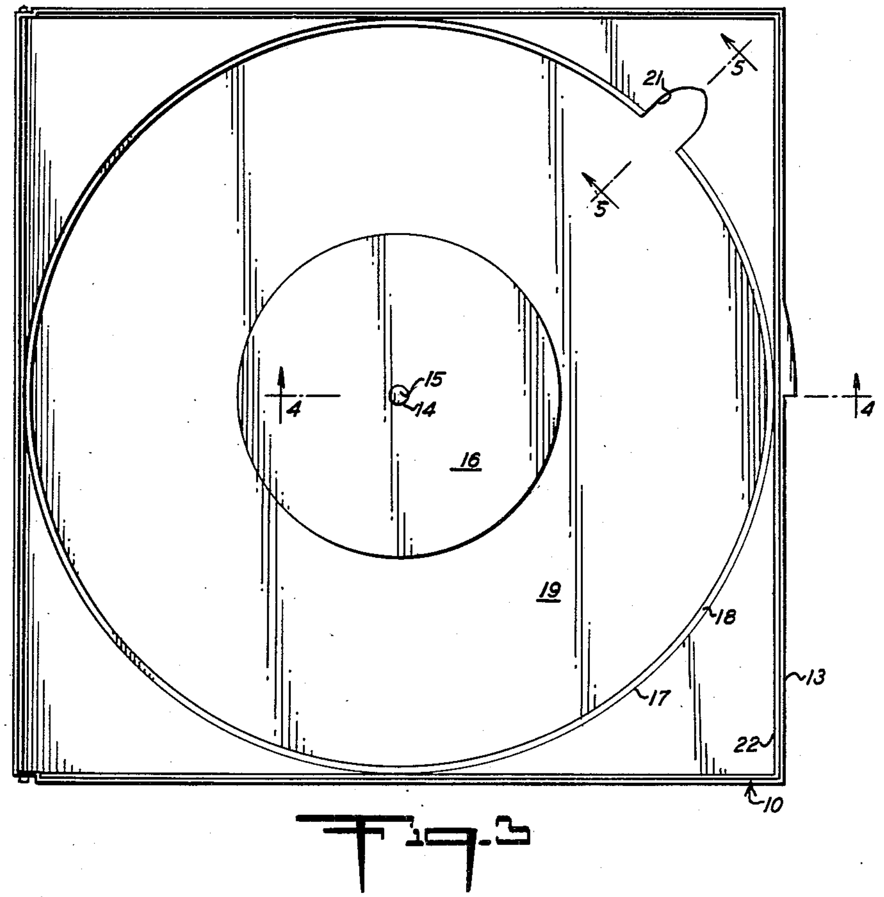
Figure 4:
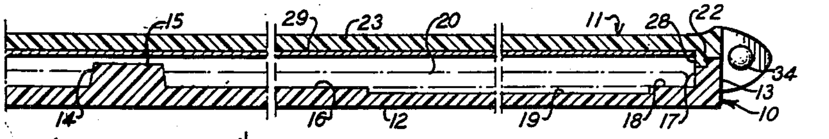
Figure 7:
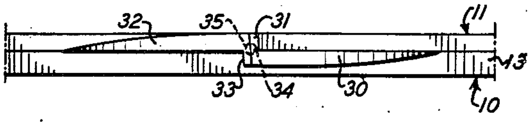
Figure 5:
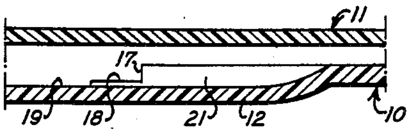

Further objects and advantages of the invention will be apparent from the following description taken in conjunction with the accompanying drawing wherein:

Fig. 1 is a fragmentary top plan view of a phonograph record container constructed in accordance with this invention;

Fig. 2, a fragmentary bottom plan view of the cover section of the record container of this invention;

Fig. 3, a top plan view of the record holding section of the container of this invention;

Fig. 4, a fragmentary enlarged, sectional view taken substantially on the line 4—4 of Fig. 3 and showing a phonograph record in place therein, as well as the cover section in closed position;

Fig. 5, an enlarged, fragmentary sectional view taken substantially on the line 5—5 of Fig. 3;

Fig. 6, an enlarged, fragmentary sectional view taken on the line 6—6 of Fig. 1;

Fig. 7, a fragmentary elevational view showing the latch means for retaining the cover section in closed position in engagement with the record holding section;

Fig. 8, a fragmentary, exploded perspective view showing the details of one of the hinges utilized to hingedly mount the color section on the record holding section;

Fig. 9, a fragmentary rear elevational view of the hinge mounting for the cover section; and Fig. 10, a fragmentary side elevational view of the hinge mounting shown in Fig. 9.

With continued reference to the drawing there is shown a record container constructed in accordance with this invention and comprising a record holding section 10 and a cover section 11 hingedly mounted thereon. Both of these sections may be injection molded or formed in any other desired manner of polystyrene or any other suitable clear plastic or other material and since the design of the container of this invention permits the use of relatively simple molds or dies, the cost of manufacture particularly in large quantity production may be maintained at a minimum.

The record holding section 10 may well comprise a bottom wall 12 and an upstanding side wall 13 completely surrounding the bottom wall 12 and the container may be either substantially rectangular, as shown, or may be of any other desired configuration. The rectangular formation is shown for purposes of illustration and description only, and is not to be considered as in any way limiting the shape of such container.

Substantially centrally of the bottom wall 12 therein is provided an upstanding, tapered stud 14, the upper surface 15 of which terminates slightly below the upper surface of the side wall 13 of the record holding section 10 and the tapered stud 14 is of such diameter as to be tightly received in the spindle hole of a record to be disposed in the container. Surrounding the tapered stud 14 is a circular surface 16 of a diameter substantially equal to or slightly greater than the normal diameter of the labeled portion of a record and the tapered stud 14 is so proportioned that with a record in place thereon, the lower surface of the same will contact and be supported by the circular surface 16. An annular shoulder 17 concentric with the tapered stud 14 and having a diameter slightly greater than the normal diameter of a record to be received in the container defines an annular surface 18 disposed in the same plane as the circular surface 16. The width of the annular surface 18 is slightly less than the ungrooved outer rim portion of a record and cooperates with the surface 16, to support the record in the record holding section 10.

An annular depression 19 is provided in the bottom wall 12 between the circular surface 16 and the annular surface 18 and the depression 19 is disposed opposite the grooved portion of a record received in the record holding section 10, the width of such depression 19 being slightly greater than the width of the grooved portion of such record. This results in a container providing a firm support and retaining means for a record received therein and in which the grooved portion of the record is maintained out of contact with any part of the container. In this way, there is no possibility of damage to the grooved portion of the record by reason of abrasion due to contact of such grooved portion with a surface of the container and likewise, the record cannot move in such container thereby preventing damage thereto due to contact with walls or portions of the container.

As shown in Fig. 4, a record 20 is disposed in the record holding section 10 with the spindle hole thereof tightly received on the tapered stud 14 and with the label portion in contact with the circular surface 16 and the ungrooved outer rim portion in contact with the annular portion 18. The grooved portion of the record is supported above the annular depression 19 thereby preventing damage thereto. Since the record 20 is firmly held in place by engagement of the spindle hole thereof over the tapered stud 14, removal of such record might prove difficult since the outer diameter thereof is only slightly less than the diameter of the annular shoulder 17. In order to facilitate removal of the record 20 from the record holding section 10 there is provided a recess 21 in the bottom wall 12, which recess is radially disposed and communicates with the depression 19. The recess 21 is of such depth that a finger may be inserted therein and under the edge of the record 20 thereby permitting convenient removal of the same from the tapered stud 14 and the record holding section 10.

The upstanding side wall 13 is provided in its upper edge with a recess 22 extending throughout the length thereof and the purpose of such recess will be presently described.

The cover section 11 may well include a top wall 23 and on opposite corners of such top wall there may be provided depending ears 24 having apertures 25 therein. The record holding section 10 is provided on opposite corners with recesses 26 from which project trunnions 27, such trunnions being adapted to being received in the apertures 25 of the ears 24 to hingedly mount the cover section 11 on the record holding section 10, as clearly shown in Figs. 8, 9 and 10. Cover section 23 is provided with a depending rib 28 which is complementary to the recess 22 in the side wall 13 of the record holding section 10 and with the cover section 11 in closed position, as shown in Fig. 4, the rib 28 will tightly engage in the recess 22 and provide a dust proof joint between the cover section 11 and the record holding section 10.

Since it has been common practice in record merchandising to provide a brochure or pamphlet giving a brief history of the composer and the work recorded on the particular record and further, since such pamphlet or brochure is frequently provided with a highly decorative cover, the record container of this invention has been so designed as to provide means for releasably retaining such brochure in place inside of the cover section 11 where the decorative cover thereof will be visible through the top wall 23 of such cover section 11. If desired, of course, a decorative panel or placard may be substituted for the brochure and the retaining means will operate in the same manner regardless of the material retained in place thereby. As best shown in Fig. 6, there may be provided inwardly extending lugs 28 integrally formed with the top wall 23 of the cover section 11 and such lugs are spaced inwardly from the inner surface of the top wall 23, a distance substantially equal to the thickness of the brochure or panel to be retained thereby. In Figs. 4 and 6, there is shown a panel or brochure 29 disposed in place between the lug 28 and the inner surface of the top wall 23 and obviously, such brochure or panel 29 will be releasably retained in place and may be conveniently removed upon opening of the cover section 11. Obviously, the brochure or panel 29 will be clearly visible through the transparent top wall 23.

In order to firmly hold the cover section 11 in closed position, as shown in Fig. 4, there may be provided latch means in the form of an elongated finger engaging portion 30 formed integrally with the sidewall 13 of the record holding section 10 and projecting outwardly therefrom and the elongated finger engaging portion 30 may be provided at one end thereof with an angularly extending portion 31 which overlaps the adjacent outer edge of the cover section 11 when the same is in closed position. A similar elongated finger engaging portion 32 is formed integrally with the cover section 11 and is provided with an angularly extending portion 33 substantially parallel to the angularly extending portion 31 and abutting the same when the cover section 11 is in closed position. A ball or other suitable protuberance 34 may be formed integrally with either the angularly extending portion 31 or the angularly extending portion 33, or such ball 34 may comprise a separate member and be secured in place by a suitable adhesive or the like, with a portion thereof projecting outwardly of the adjacent surface of the angularly extending portion. The opposite angularly extending portion is provided with a recess or depression 35 complementary to the ball or protuberance 34 and, as best shown in Fig. 7, when the cover section 11 is in closed position, the ball or protuberance 34 will engage in the depression 35 and firmly latch the cover section in such closed position. When it is desired to open the container it is only necessary to place the thumb beneath the elongated finger engaging portion 32 and the index finger on the upper surface of the elongated finger engaging portion 33 and by exerting a twisting action, the cover section 11 will be easily forced away from the record holding section 10, whereupon the container is opened and the record 20 may be conveniently removed therefrom by placing the finger in the recess 21 to engage the edge of the record 20.

It will be seen that by the above described invention there has been provided a phonograph record container which may be conveniently and economically manufactured from transparent materials and which will operate to securely hold a record in place therein with the grooved portions of such record out of contact with any part of the container and, at the same time, permitting visual inspection of the grooved portion of such record without moving the same from the container. The container of this invention also permits a brochure or the like to be detachably retained therein and be visible through the cover section of such container, and obviously, the surfaces of the container may be treated or formed in any manner desired to enhance the decorative features thereof.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A phonograph record container of transparent material and comprising a one-piece record holding section and a one-piece cover section hingedly mounted thereon, said record holding section comprising a bottom wall and an upstanding sidewall surrounding said bottom wall, a centrally located, tapered stud extending upwardly from said bottom wall for tightly engaging in the spindle hole of a record, a circular surface surrounding said stud of a diameter substantially equal to the diameter of the label portion, an annular shoulder concentric with said stud and of a diameter slightly greater than the diameter of a record to be received in said record holding section, said shoulder defining an annular surface disposed in the same plane as said circular surface, an annular depression in said bottom wall between said circular surface and said annular surface, the width of said depression being slightly greater than the width of the grooved portion of said record whereby a record disposed in said record holding section with said stud tightly engaged in the spindle hole of said record will be supported by said circular surface and said annular surface with the grooved portion of said record disposed opposite said depression and out of contact with said bottom wall, a recess in said bottom wall between said shoulder and said side wall and communicating with said depression to facilitate removal of said record, a recess in the upper edge of said sidewall extending throughout the length thereof, said cover section comprising a top wall and a depending rib complementary to said last named recess and engaging therein when said cover is closed to provide a dust tight joint, a plurality of lugs extending inwardly from opposite side edges of said cover section in spaced relation to the inner surface of said top wall, a brochure or placard disposed between said lugs and the inner surface of said top wall and visible through said top wall and interengaging latch means on said cover section and said record holding section for releasably securing said cover section in closed position.

2. A phonograph record container of transparent material and comprising a one-piece record holding section and a one-piece cover section hingedly mounted thereon, said record holding section comprising a bottom wall and an upstanding side wall surrounding said bottom wall, a centrally located tapered stud extending upwardly from said bottom wall for tightly engaging in the spindle hole of a record, a circular surface surrounding said stud of a diameter substantially equal to the diameter of the label portion of the record, an annular shoulder concentric with said stud and of a diameter slightly greater than that of the diameter of a record to be received in said record holding section, said shoulder defining an annular surface disposed in the same plane as said circular surface, an annular depression in said bottom wall between said circular surface and said annular surface, the width of said depression being slightly greater than the width of the grooved portion of said record whereby a record disposed in said record holding section with said stud tightly engaged in the spindle hole of said record will be supported by said circular surface and said annular surface with the grooved portion of said record disposed opposite said depression and out of contact with said bottom wall, a recess in said bottom wall between said shoulder and said side wall and communicating with said depression to facilitate removal of said record, a recess in the upper edge of said sidewall extending throughout the length thereof, said cover section comprising a top wall and a depending rib complementary to said last named recess and engaging therein when said cover is closed to provide a dust tight joint, a plurality of lugs extending inwardly from opposite side edges of said cover section in spaced relation to the inner surface of said top wall, a brochure or placard disposed between said lugs and the inner surface of said top wall and visible through said top wall and means for releasably securing said cover section in closed position.

3. A phonograph record container of transparent material and comprising a one-piece record holding section and a one-piece cover section hingedly mounted thereon, said record holding section comprising a bottom wall and an upstanding side wall surrounding said bottom wall, a centrally located tapered stud extending upwardly from said bottom wall for tightly engaging in the spindle hole of a record, a circular surface surrounding said stud of a diameter substantially equal to the diameter of the label portion of a record, an annular shoulder concentric with said stud and of a diameter slightly greater than a diameter of a record to be received in said record holding section, said shoulder defining an annular surface disposed in the same plane as said circular surface, an annular depression in said bottom wall between said circular surface and said annular surface, the width of said depression being slightly greater than the width of the grooved portion of said record whereby a record disposed in said record holding section with said stud tightly engaged in the spindle hole of said record will be supported by said circular surface and said annular surface at the grooved portion of said record disposed opposite said depression and out of contact with said bottom wall, a recess in said bottom wall between said shoulder and said side wall and communicating with said depression to facilitate removal of said record, a recess in the upper edge of said side wall extending throughout the length thereof, said cover section comprising a top wall and a depending rib complementary to said last named recess and engaging therein, when said cover is closed to provide a dust tight joint, a plurality of lugs extending inwardly from opposite edges of said cover section in spaced relation to the inner surface of said top wall to releasably retain a brochure or placard therein and means for releasably securing said cover section in closed position.

4. A phonograph record container of transparent material and comprising a one-piece record holding section and a one-piece cover section hingedly mounted thereon, said record holding section comprising a bottom wall and an upstanding side wall surrounding said bottom wall, a centrally located tapered stud extending upwardly from said bottom wall for tightly engaging in the spindle hole of a record, a circular surface surrounding said stud of a diameter substantially equal to the diameter of the label portion of a record, an annular shoulder concentric with said stud and of a diameter slightly greater than the diameter of a record to be received in said record holding section, said shoulder defining an annular surface disposed in the same plane as said circular surface, an annular depression in said bottom wall between said circular surface and said annular surface, the width of said depression being slightly greater than the width of the grooved portion of said record whereby a record disposed in said record holding section with said stud tightly engaged in the spindle hole of said record will be supported by said circular surface and said annular surface with the grooved portion of said record disposed opposite said depression and out of contact with said bottom wall, a recess in said bottom wall between said shoulder and said side wall and communicating with said depression to facilitate removal of said record, said cover section including a top wall, means to provide a dust tight joint when said cover section is closed, a plurality of lugs extending inwardly from opposite side edges of said cover section in spaced relation to the inner surface of said top wall to releasably retain a brochure or placard therein, and means for releasably securing said cover section in closed position.

References Cited in the file of this patent

UNITED STATES PATENTS

| | | |
|---|---|---|
| 774,037 | Buergi | Nov. 1, 1904 |
| 1,320,958 | Albrecht et al. | Nov. 4, 1919 |
| 1,440,737 | Jones | Jan. 2, 1923 |
| 2,306,726 | Hasin | Dec. 29, 1942 |
| 2,446,966 | Swikart | Aug. 10, 1948 |
| 2,679,929 | Fleisig | June 1, 1954 |
| 2,691,440 | Spugios et al. | Oct. 12, 1954 |

FOREIGN PATENTS

| | | |
|---|---|---|
| 749,720 | France | May 8, 1933 |